(12) United States Patent
Black et al.

(10) Patent No.: US 10,672,428 B1
(45) Date of Patent: Jun. 2, 2020

(54) HIGH-DENSITY OPTICAL DATA RECORDING

(71) Applicant: Microsoft Technology Licensing, LLC, Redmond, WA (US)

(72) Inventors: Richard John Black, Cambridge (GB); Patrick Neil Anderson, Cambridge (GB); Rokas Drevinskas, Cambridge (GB); Austin Nicholas Donnelly, Cambridge (GB); Hugh David Paul Williams, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/408,374

(22) Filed: May 9, 2019

(51) Int. Cl.
*G11B 7/0045* (2006.01)
(52) U.S. Cl.
CPC .............................. *G11B 7/00456* (2013.01)
(58) Field of Classification Search
None
See application file for complete search history.

(56) References Cited

U.S. PATENT DOCUMENTS

| | | | | |
|---|---|---|---|---|
| 5,136,152 A * | 8/1992 | Lee | ...................... | G02B 6/4204 257/433 |
| 5,703,848 A * | 12/1997 | Hofer | .................... | G11B 7/0946 369/44.29 |
| 6,118,756 A * | 9/2000 | Masuhara | .......... | G11B 7/24082 369/275.4 |
| 6,940,801 B1 * | 9/2005 | Ishii | ...................... | G11B 7/0045 365/120 |
| 2004/0240337 A1 * | 12/2004 | Akkermans | .......... | G11B 7/0045 369/44.25 |
| 2010/0124160 A1 * | 5/2010 | Kamiguchi | ............ | B82Y 10/00 369/112.24 |

\* cited by examiner

*Primary Examiner* — Peter Vincent Agustin
(74) *Attorney, Agent, or Firm* — Alleman Hall Creasman & Tuttle LLP

(57) ABSTRACT

A method to record data in a solid substrate comprises modulating a polarization angle of a coherent optical pulsetrain, and, while the polarization angle is being modulated, focusing the coherent optical pulsetrain on a locus moving through the solid substrate at a relative velocity. Here the relative velocity, a width of the locus in a direction of the relative velocity, and a rate of modulation of the polarization angle are such that the substrate receives within the width of the locus two or more pulses of the optical pulsetrain differing in polarization angle. In this manner, the two or more pulses record, in different portions of the substrate within the width of the locus, two or more different symbols.

16 Claims, 11 Drawing Sheets

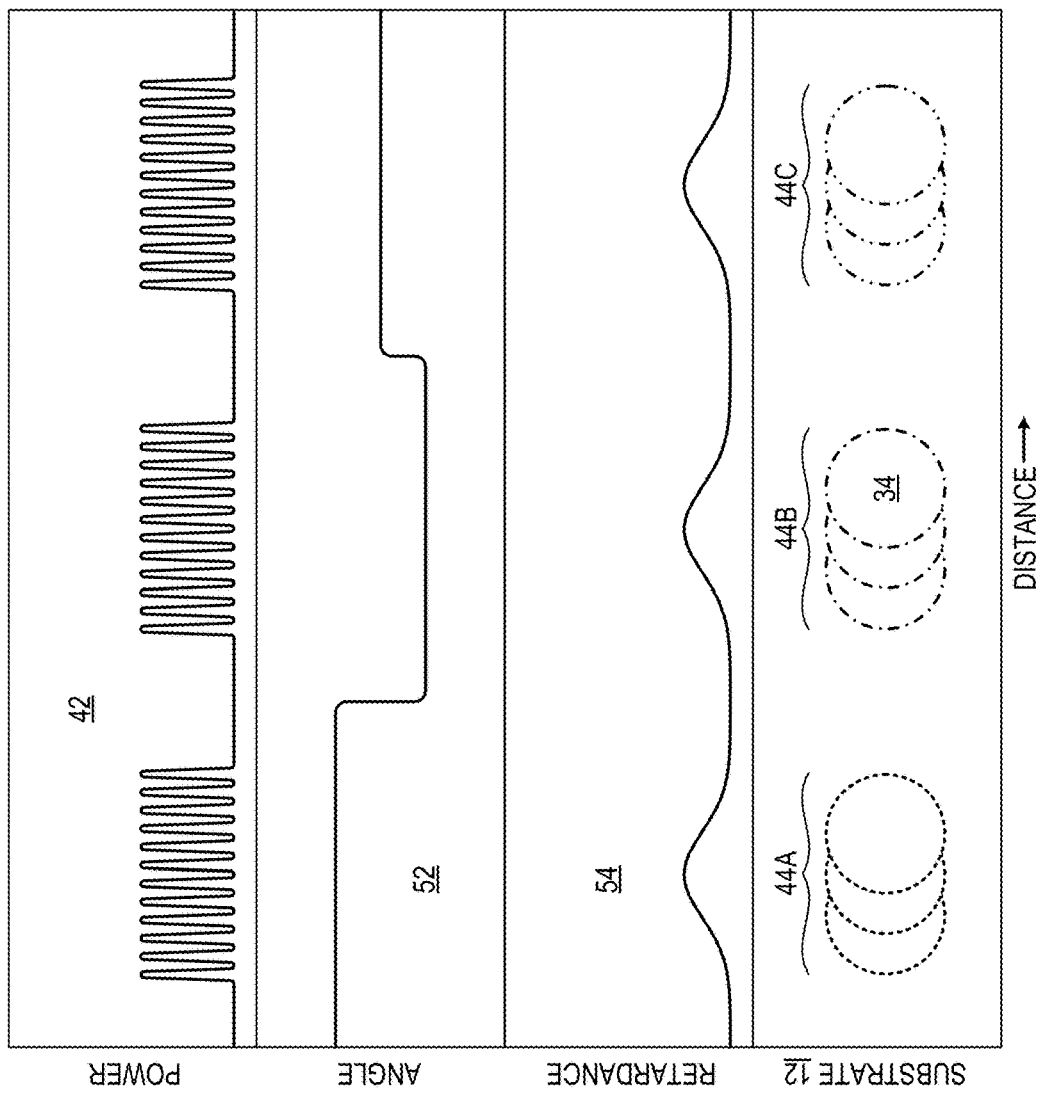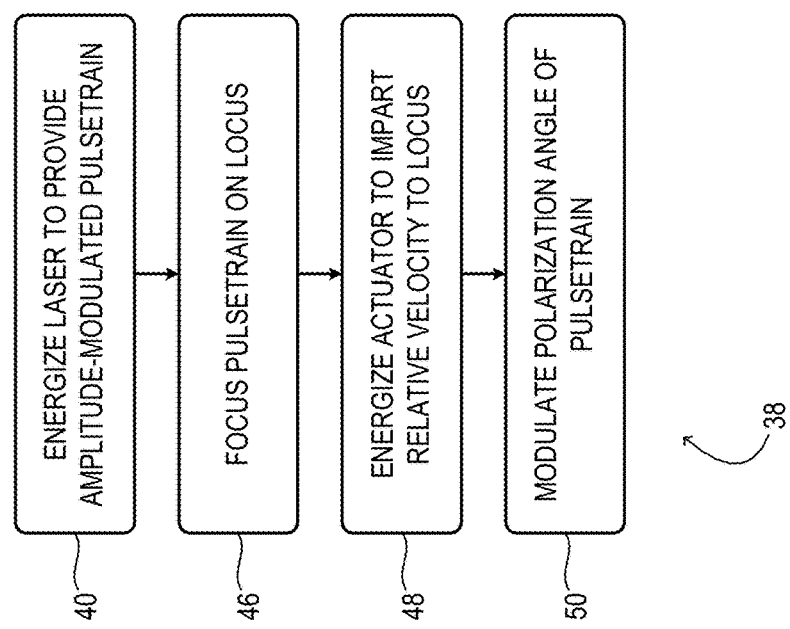
FIG. 3

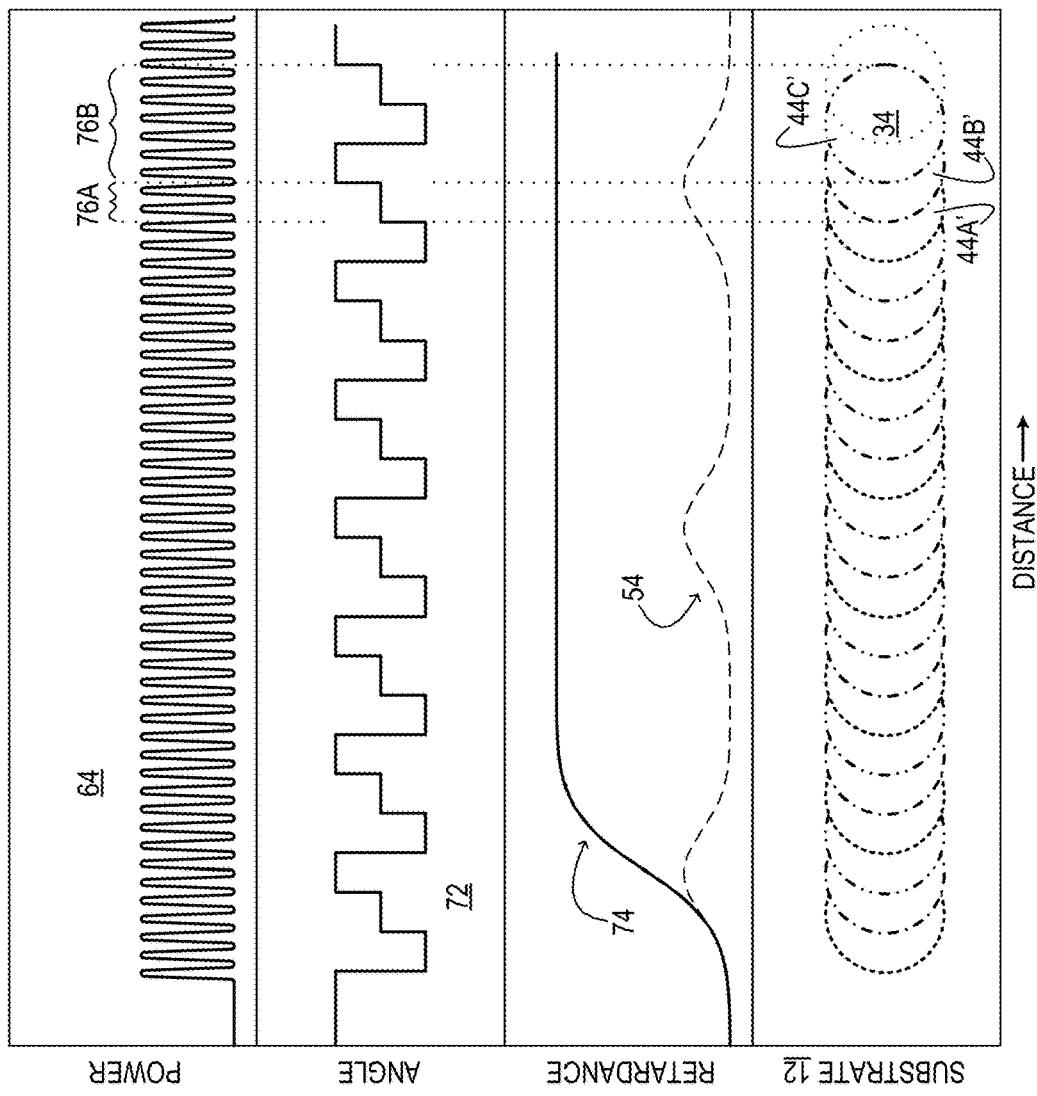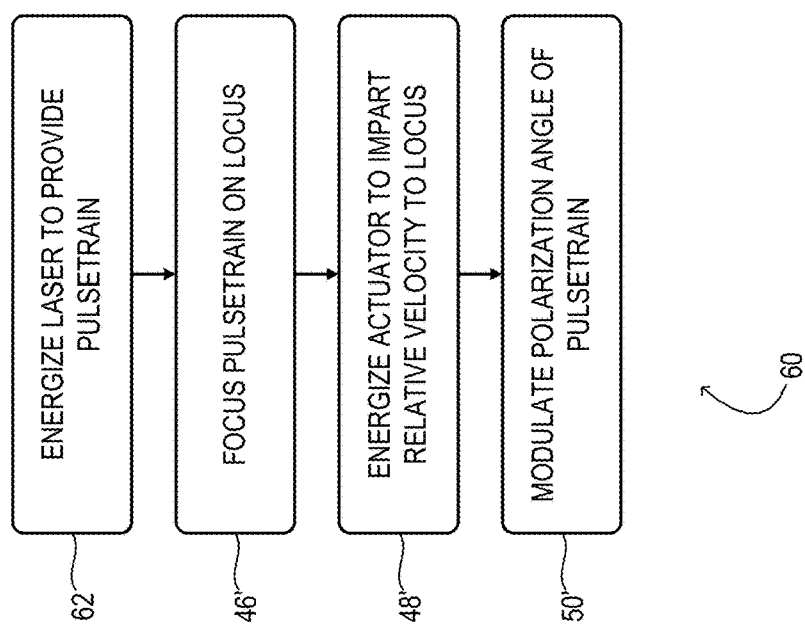
FIG. 5

HIGH-DENSITY OPTICAL DATA RECORDING

BACKGROUND

High-power, short-pulse laser irradiance can be used to optically write and store data in a solid dielectric substrate, such as glass. The irradiance induces at its focus a long-lived lattice perturbation caused by non-linear, multi-photon absorption by the substrate. In some cases, the lattice perturbation has the optical properties of a very small diffraction grating embedded within the substrate at the point where the irradiance is focused. Data written to a substrate in this manner can be read back using polarization imaging to interrogate the various grating-like perturbations formed within the substrate.

SUMMARY

Examples disclosed herein relate to a method to record data in a solid substrate. The method comprises modulating a polarization angle of a coherent optical pulsetrain, and, while the polarization angle is being modulated, focusing the coherent optical pulsetrain on a locus moving through the solid substrate at a relative velocity. In this method, the relative velocity, the width of the locus in the direction of the relative velocity, and the rate of modulation of the polarization angle are such that the substrate receives, within the width of the locus, two or more pulses of the optical pulsetrain that differ in polarization angle. In this manner, the two or more pulses record, in different portions of the substrate within the width of the locus, two or more different symbols.

Other examples relate to a solid substrate comprising at least one series of adjacent voxel volumes probeable by polarization imaging, the at least one series including contiguous first and second birefringent voxel volumes, wherein a birefringence of the first voxel volume encodes a first written symbol, and the birefringence of the second voxel volume encodes a second written symbol.

Still other examples relate to a data-recording system comprising a modulation system, a solid substrate, an actuator, and an encoder. The modulation system is configured to modulate the polarization angle of a coherent optical pulsetrain focused on a locus, and the solid substrate is arranged to receive the coherent optical pulse train at the locus. The actuator is configured to vary, at a relative velocity and while the polarization angle is being modulated, the relative position of the locus to the solid substrate. The encoder is configured to control the relative velocity and the rate of modulation of the polarization angle such that the substrate receives within the width of the locus two or more pulses of the optical pulsetrain differing in polarization angle and encoding two or more different symbols.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 illustrates aspects of a comparative method to record data optically in a substrate.

FIG. 5 illustrates aspects of an example method to record data optically in a substrate.

DETAILED DESCRIPTION

Figure 1A:
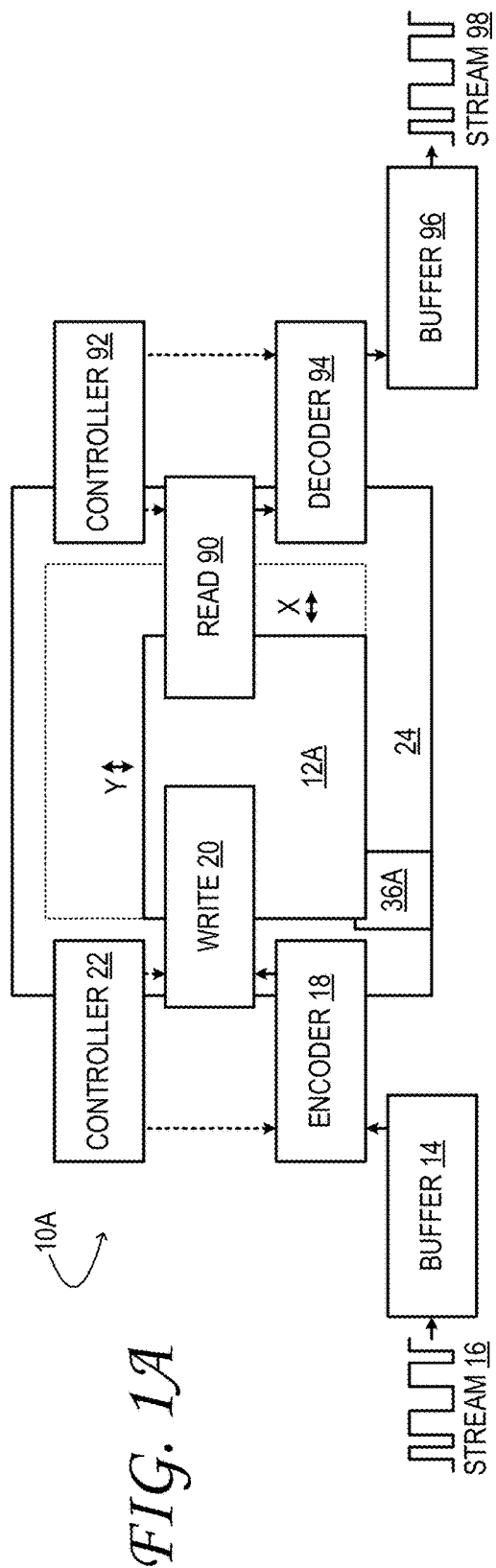
FIGS. 1A and 1B show aspects of example optical data-recording systems with integrated data-retrieval.

As noted above, data can be written to a glass or other solid substrate using high-power, coherent irradiance. The term 'voxel' is used herein to refer to any discrete volume of a substrate where an individual data value (i.e., symbol) may be stored. The data stored in a voxel may take various forms. In principle, any of the Muller-matrix coefficients of a substrate lattice can be manipulated to encode data. In examples using silica glass substrates, the lattice perturbation from focused, polarized irradiance takes the form of a non-native birefringence localized at the focus. Accordingly, each voxel of the substrate can be modeled as a very small waveplate of a retardance magnitude $\delta d$ and an azimuth angle $\varphi$. These model parameters can be manipulated independently to write a desired symbol to a given voxel, with the polarization angle of the write beam determining the azimuth angle $\varphi$ and the energy of the write beam determining, in some examples, the strength of the waveplate grating, and therefore the retardance magnitude $\delta d$.

By dividing the continuous space of achievable azimuth angles and/or retardance magnitudes into discrete intervals, multi-bit data values can be encoded into each voxel—viz., by coercing the birefringence of that voxel to be within one of the discrete intervals. In this manner, each voxel may encode one of $R \geq 1$ different retardance magnitudes at each of $Q \geq 1$ different azimuth angles. In some examples, many parallel layers of voxel structures may be written to the same substrate by focusing the laser irradiance to specified depths below the irradiated surface of the substrate. This mode of optical data recording is referred to as '5D optical storage'.

In order to record data at high density, it may be desirable to position adjacent voxels contiguously, or nearly so, and to shrink each voxel volume down to the limit of reliable writability and readability. This strategy may also increase the data-writing bandwidth in implementations in which the write beam is rastered through the substrate. In current approaches, however, the voxel volume is limited by the size of the locus to which the write beam can be focused. Although the minimum locus size may approach the diffraction limit in the ideal case, it may be much larger in practice due to optical non-idealities.

To address these issues and provide still other advantages, examples are disclosed herein that exploit the multi-photon mechanism of optical data recording. In the approach here disclosed, data is written to a substrate in substantially continuous rows as the focus of the laser moves through the substrate. The accumulation of pulses received at the focus primes the irradiated volume of the substrate, making it increasingly pliable to the writing process. In this scenario, only the final pulses received within a given volume fix the waveplate to a final orientation, thereby committing a symbol to a voxel. Accordingly, a continuous or nearly continuous row or series of written voxels is formed in the substrate, providing high storage density and bandwidth.

In the examples described below, components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1A shows aspects of an example optical data recording system 10A with integrated data retrieval. Data recording system 10A is configured to write and store data in solid dielectric substrate 12A. The substrate may differ from one implementation to the next, but is generally transparent at first order, at least in the wavelength range of the irradiance used to write and read the data. In some implementations, the substrate may be a polymer. In some implementations, the substrate may be an inorganic glass such as silica glass, fused quartz, or fused silica. In some implementations, the substrate may take the form of a relatively thin optical layer (30 to 300 microns, for instance), coupled to a mechanically stable supporting layer.

Buffer 14 of data recording system 10A is configured to buffer the input data stream 16 to be written to substrate 12A. The input data stream may include digital data in some implementations. Encoder 18 is configured to parse the data from the buffer and to provide appropriate control signal to write head 20, such that the data is written according to a predetermined encoding scheme, in accordance with the methods herein. Additional aspects of the encoding and write process are controlled by write controller 22.

Figure 1B:
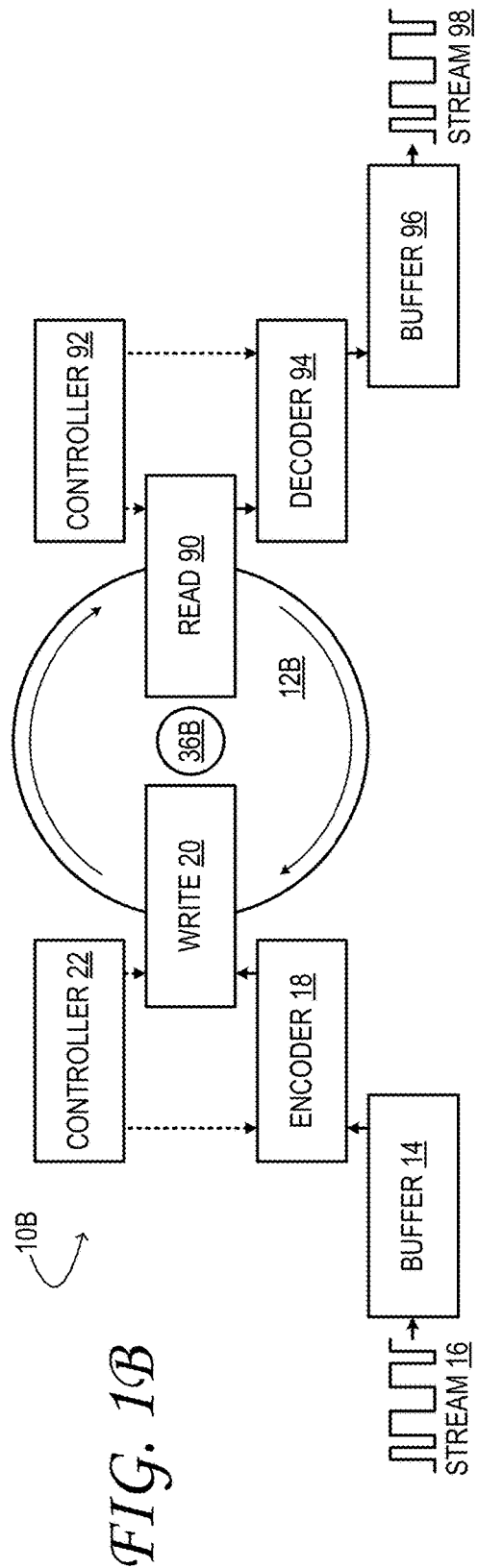

Substrate 12A is shown in FIG. 1A in the form of a rectangular slab arranged on an XY translational stage 24. FIG. 1B shows aspects of another optical data recording system 10B, in which substrate 12B takes the form of rotating disk. In other examples, the substrate may be shaped differently—as a rotating cylinder, for instance. In other examples, write head 20 may be configured to move in one or more directions and/or rotations, and the substrate may be stationary. In still other examples, the substrate may be stationary with respect to the write head, which may include appropriate beam-steering componentry to direct the writing to specified regions of the substrate. In any implementation in which the substrate and write head are moved relative to each other, the relative motion, including the instantaneous relative velocity, may be controlled by encoder 18.

Figure 2:
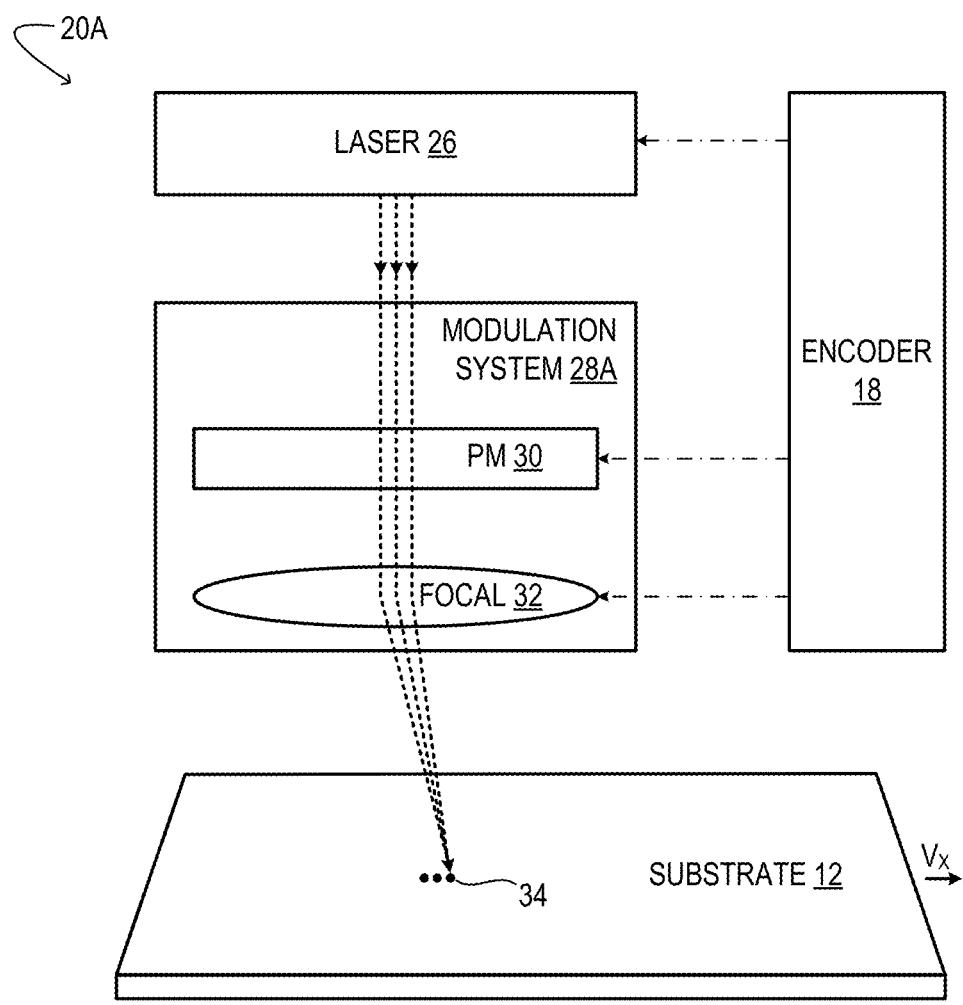
FIG. 2 shows aspects of an example write head of an example optical data-recording system.

FIG. 2 shows aspects of an example write head 20A of optical data recording system 10. Write head 20A includes a high-power laser 26 and a modulation system 28A. The modulation system includes an electronically addressable polarization modulator (PM) 30 and a focal system 32.

Laser 26 is configured to emit a coherent optical pulsetrain of fixed phase and polarization. In some implementations, the laser may be a femtosecond laser emitting in a fixed wavelength band. Depending on the detailed implementation, wavelength bands in the ultraviolet, visible, near-infrared, and mid-infrared are all envisaged. In some implementations, the laser may be Q-switched and/or mode-locked, to provide very brief pulses of very high energy. Depending on the detailed implementation, pulse energies in the picojoule to microjoule range may be used. Irradiance from the laser may comprise a repeating pulsetrain of photon pulses tens to thousands of femtoseconds in duration, in some examples. Repetition rates of 1 to 100 MHz may be used in some examples, although faster and slower repetition rates are also envisaged. Depending on the detailed implementation, the width of the individual pulses may range from 10 femtoseconds to 10 picoseconds, for instance. In some implementations, shorter wavelengths of light maybe formed using optical harmonic generators employing non-linear optical processes. Other forms of laser irradiance are also envisaged. In examples in which the amplitude of the coherent optical pulsetrain is modulated, encoder 18 may be configured to control the modulation.

In write head 20A of FIG. 2, modulation system 28A is arranged optically downstream of laser 26, such that the coherent optical pulsetrain from laser 26 passes through PM 30. Reflective and diffractive PM variants are also envisaged. The PM is a non-imaging active optic configured to rotate, by a controllably variable angle, the polarization state of the coherent optical pulsetrain. In examples in which the coherent optical pulsetrain is plane-polarized, modulation of the polarization state includes synchronously rotating the plane of oscillation of the electric field vector of the coherent optical pulsetrain through a series of pre-selected angles. In write head 20A, PM 30 is coupled operatively to encoder 18. The encoder provides electronic signal to the PM that defines the variable rotation applied to the polarization state.

In this manner, the modulation system is configured to modulate the polarization angle of the coherent optical pulsetrain focused on locus 34 by focal system 32. The term 'locus' refers herein to the region of space at which the coherent optical pulsetrain (i.e., the write beam) is focused with sufficient energy to modify the birefringence of the substrate. In some examples, the locus may comprise the entire focal volume of the write beam. In other examples, the locus may correspond to a 'hot spot' inside the focal volume. As shown in FIG. 2, substrate 12 is arranged to receive the coherent optical pulsetrain focused on locus 34. In examples in which data is to be written to a plurality of depth layers of substrate 12, focal system 32 may have an adjustable focal length controlled by encoder 18, so that the irradiance of the write beam may be focused to any selected depth layer of the substrate. In other examples, the distance between the write head 20A and substrate 12 may be varied so as to select the depth layer of the substrate to receive the coherent optical pulsetrain. Although write head 20A employs a single write beam with modulated polarization angle, this disclosure also embraces configurations in which the required variable polarization is provided by mixing plural write beams of fixed or variable polarization. In beam-mixing configurations, the coherent optical pulsetrain is defined from the point of view of the irradiated locus. In other words, a pulsetrain may comprise pulses from a single write beam or from two or more different write beams.

Returning briefly to FIG. 1A, substrate 12A is supported by stage 24, which is coupled mechanically to actuator 36. By moving the substrate in one or more directions, the actuator varies the relative position of locus 34 with respect to the substrate. In effect, the actuator imparts a relative velocity to the locus even as the polarization angle of the write beam is being modulated. Naturally, an analogous effect may also be achieved by rotating the substrate relative to the write head (as shown in FIG. 1B), by moving the write head while the substrate remains fixed, or by moving concurrently both the substrate and the write head. In some examples, write head 20 may include sensory componentry (not shown in the drawings) configured to sense the relative displacement between the write head and the substrate. The relative displacement may be sensed in the X, Y, and/or Z directions. In some examples, the relative displacement may be furnished as output data to encoder 18 and/or write controller 22 and used to control actuator 36 and/or focal system 32 in a closed-loop manner. The overall displacement-control scheme may employ predetermined trajectories and set-points, so as to accurately control the movement of the locus within the substrate and achieve the desired function.

Based on the configurations described herein, a write head 20 may be configured to write a symbol $S_i$ to each voxel i of a substrate, encoded by the birefringence properties of that voxel. The symbol may be expressed as a digital value or bit sequence—e.g., 00, 01, 10, 11. This can be achieved, for example by encoding either of two possible azimuth angles and either of two possible retardance magnitudes for each azimuth angle. Another example encoding may include three possible polarization angles at a single retardance magnitude. In general, each voxel may encode one of $R \geq 1$ different retardance magnitudes at each of $Q \geq 1$ different azimuth angles, where Q and R are integers. The use of a larger menu of polarization angles and/or retardance magnitudes may correspond to a longer bit sequence written to each voxel.

FIG. 3 illustrates aspects of a comparative method 38 to record data optically in a substrate. For ease of description, the methods herein are described with continued reference to the above configurations. It will be understood however, that different configurations may also support the methods.

At 40 of method 38, laser 26 is energized to provide an amplitude-modulated, coherent optical pulsetrain. Graph 42 of FIG. 3 represents the instantaneous power of the coherent pulsetrain from laser 26 during execution of method 38. As shown in this graph, the amplitude of the pulsetrain is modulated to coincide with the writing of individual voxels 44 in substrate 12. At 46 the coherent optical pulsetrain from the laser is focused to a predetermined depth layer of the substrate. More specifically, the coherent optical pulsetrain is focused on a locus 34. At 48 actuator 36 is energized to impart a relative velocity to the locus relative to the substrate through which it moves. In some examples, encoder 18 may control actuator 36 and focal system 32 so as to cause the locus to raster through each of a plurality of depth layers of the substrate, the actuator imparting a substantially constant relative velocity during the writing of each row. It will be noted that the term 'row' refers herein to a series of locus-sized volumes of the substrate, whether or not the volumes happen to lie on a straight line. Accordingly, the terms 'row' and 'series' are used interchangeably in this context. In implementations in which the substrate is a rotating disc, for example, the series of substrate volumes may lie on a circular arc, rather than a row. Further, in some examples, a row may be arranged along a range of material depths.

Continuing in FIG. 3, at 50 the polarization angle of the coherent optical pulsetrain is modulated to provide the predetermined azimuth angle of the birefringence for the voxel to be written within the current locus, as the locus continues to move through the substrate at the relative velocity. Graph 52 of FIG. 3 represents the polarization angle as controlled by PM 30, and graph 54 represents the retardance magnitude of the birefringence encoded into the substrate at the current locus. In this method, all of the pulses directed to a given locus-sized volume of the substrate have the same polarization angle. That results in the writing of three distinct voxels 44A, 44B, and 44C, with different symbols. In this method, each voxel is wider in the scan direction than locus 34, because each voxel is a superposition of two or more locus-sized volumes.

Figure 4:
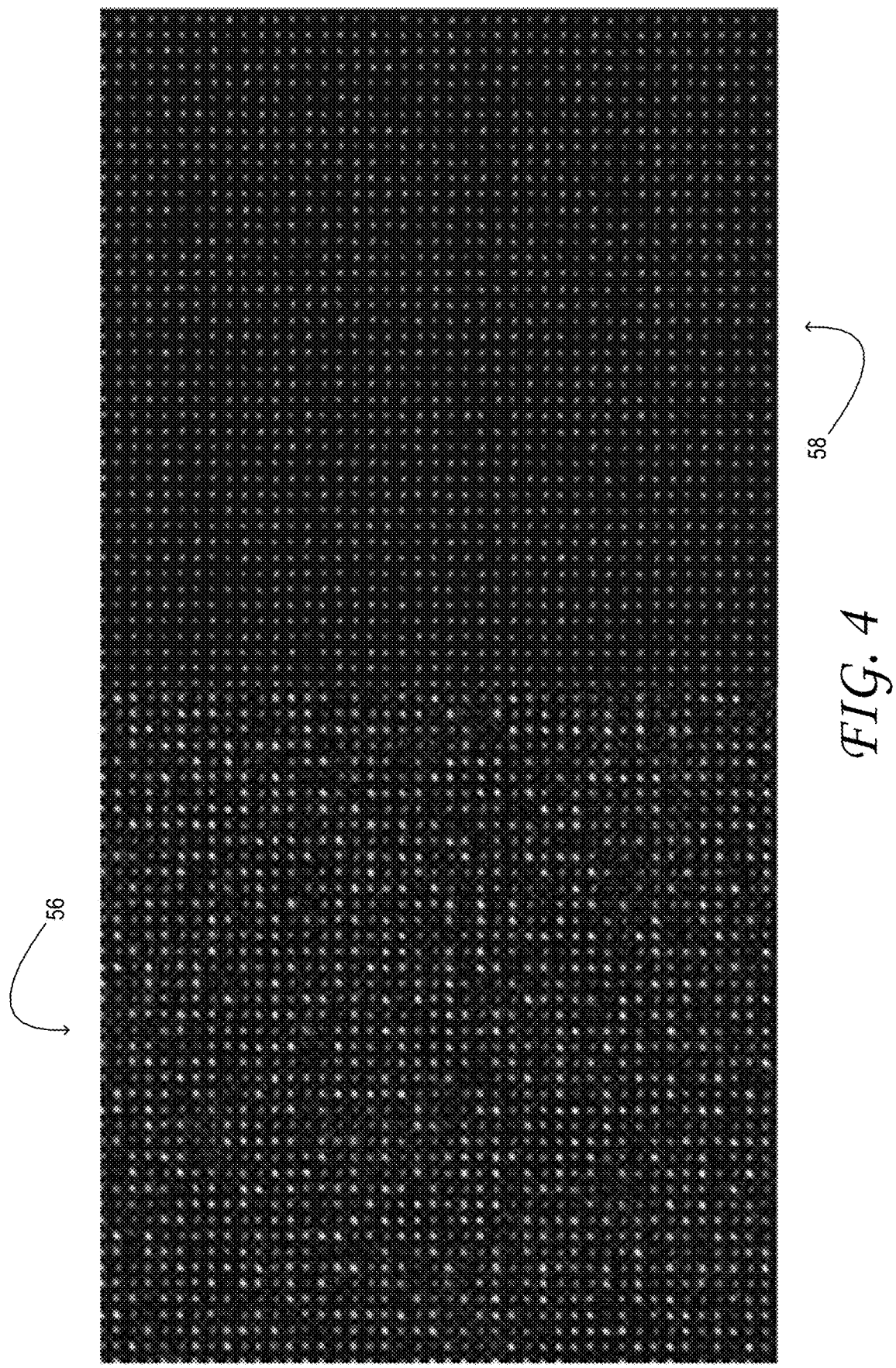
FIG. 4 shows complementary birefringence maps of a layer of a substrate as modified by an example execution of the comparative method of FIG. 3.

FIG. 4 shows complementary birefringence maps of a layer of a substrate as modified by execution of comparative method 38, in one example. The left panel of FIG. 4 is a map 56 of the azimuth angle as a function of XY position on the substrate layer after several rows of voxels have been written. The right panel of FIG. 4 is a corresponding map 58 of the retardance magnitude. Both maps reveal a regular array of voxels with significant unwritten space between the voxels, each voxel having a detectable retardance magnitude.

In some scenarios, the data density and the retardance magnitude may be increased by applying comparative method 38 at a reduced scan rate. That remedy, however, offers no corresponding increase the bandwidth of data recording. Moreover, the data density would eventually be limited by the minimum size of the locus 34 to which the write beam can be focused. As noted previously, the minimum size of the locus may approach the diffraction limit in the ideal case but may be much larger in practice, due to optical non-idealities.

In view of these issues, FIG. 5 illustrates aspects of an improved method 60 to record data optically in a substrate. At 62 of method 60, laser 26 is energized to provide a coherent optical pulsetrain. Graph 64 of FIG. 5 represents the instantaneous power of the coherent pulsetrain from laser 26 during execution of method 60. Instead of modulating the amplitude of the pulsetrain from the laser, as in comparative method 38, the amplitude in method 60 is maintained above a threshold—e.g., a threshold for providing sufficient energy to modify the birefringence of the substrate. In some examples, the amplitude may be held constant. At 46' the coherent optical pulsetrain from the laser is focused to a predetermined depth layer of the substrate. More specifically, the coherent optical pulsetrain is focused on a locus 34. At 48' actuator 36 is energized to impart a relative velocity to the locus relative to the substrate through which it moves. In examples in which data is to be written to plural depth layers of the substrate, focal system 32 may be controlled appropriately to adjust the focal depth, as described above.

At 50' the polarization angle of the coherent optical pulsetrain is modulated to provide the predetermined azimuth angle of the birefringence for a voxel to be written within the current locus, as the locus continues to move through the substrate at the relative velocity. Graph 72 of FIG. 5 represents, in one example, the polarization angle of the coherent optical pulsetrain as controlled by PM 30, and graph 74 represents the magnitude of the birefringence encoded into the substrate at the current locus. In this method, the relative velocity, the width of the locus in a direction of the relative velocity, and the rate of modulation of the polarization angle are such that the substrate may receive, within the width of the locus, two or more pulses of the optical pulsetrain differing in polarization angle. In other words, while the polarization angle is being modulated, the coherent optical pulsetrain remains focused on locus 34, which moves through the substrate at the relative velocity. This action delivers, within the width of the locus, two or more pulses differing in polarization angle. The two or more pulses record, in different portions of the substrate all within the width of the locus, two or more different symbols. In some implementations, the polarization angle may be changed at least once within a period T=W/V, where V is the relative velocity and W is the width of the locus in the direction of the relative velocity.

As shown in FIG. 5, the two or more pulses differing in polarization angle are received within a locus-sized volume of the substrate as the polarization angle is modulated and as the locus continues to move through the substrate. Naturally, the locus-sized volume into which the two or more pulses are received may be one of a series (e.g., row) of consecutive, congruent volumes of the solid substrate. In some examples, the polarization angle continues to be modulated and the amplitude of the coherent optical pulsetrain continues to be maintained as the locus moves from one to another volume in the series.

Receipt of the two or more pulses forms two or more voxels 44' within the width of the locus. In general, each of the two or more voxels (e.g., voxels 44A', 44B', 44C') may present a different birefringence to probe light during subsequent reading of the substrate. Stated another way, the two or more pulses may record, in different portions of the substrate within the width of the locus, two or more different symbols.

The method of FIG. 5 is informed by the multi-photon mechanism of optical data storage in dielectric substrates. In particular, the accumulation of high-energy pulses at the locus of irradiation primes the irradiated volume of the substrate, making it increasingly pliable to the writing process. In this scenario, only the final pulses received within a given volume fix the waveplate orientation to its final value, thereby committing a symbol to a voxel. Accordingly, a continuous or nearly continuous row of written voxels 44' may be formed in the substrate. This enables the data to be recorded at high density and high bandwidth.

From the point of view of a given voxel 44', the two or more pulses received within locus 34 include one or more early pulses and one or more late pulses (i.e., pulses received later than any of the early pulses). The early pulses make the entire volume under the locus more pliable to data writing; the late pulses set the birefringence of the leftmost voxel within that volume, just before the locus moves on. For instance, from the point of view of voxel 44C', pulses 76A are early pulses, and pulses 76B are late pulses. Pulses 76A prime the volume under the locus, including the volume corresponding to voxel 44C'. Late pulses 76B then set the birefringence of voxel 44C' to its final value. Just after delivering the late pulses, the locus moves on and away from voxel 44C', leaving secure the encoded birefringence, and in particular, the azimuth angle of the birefringence as determined by the polarization angle of the late pulses. In effect, the one or more early pulses pre-emptively increase the retardance magnitude of the birefringence of each voxel at the azimuth angle that is ultimately set by receipt of the one or more late pulses. The increase is relative to the hypothetical case in which no early pulses are received, in which case the retardance magnitude may be quite small.

Figure 6:
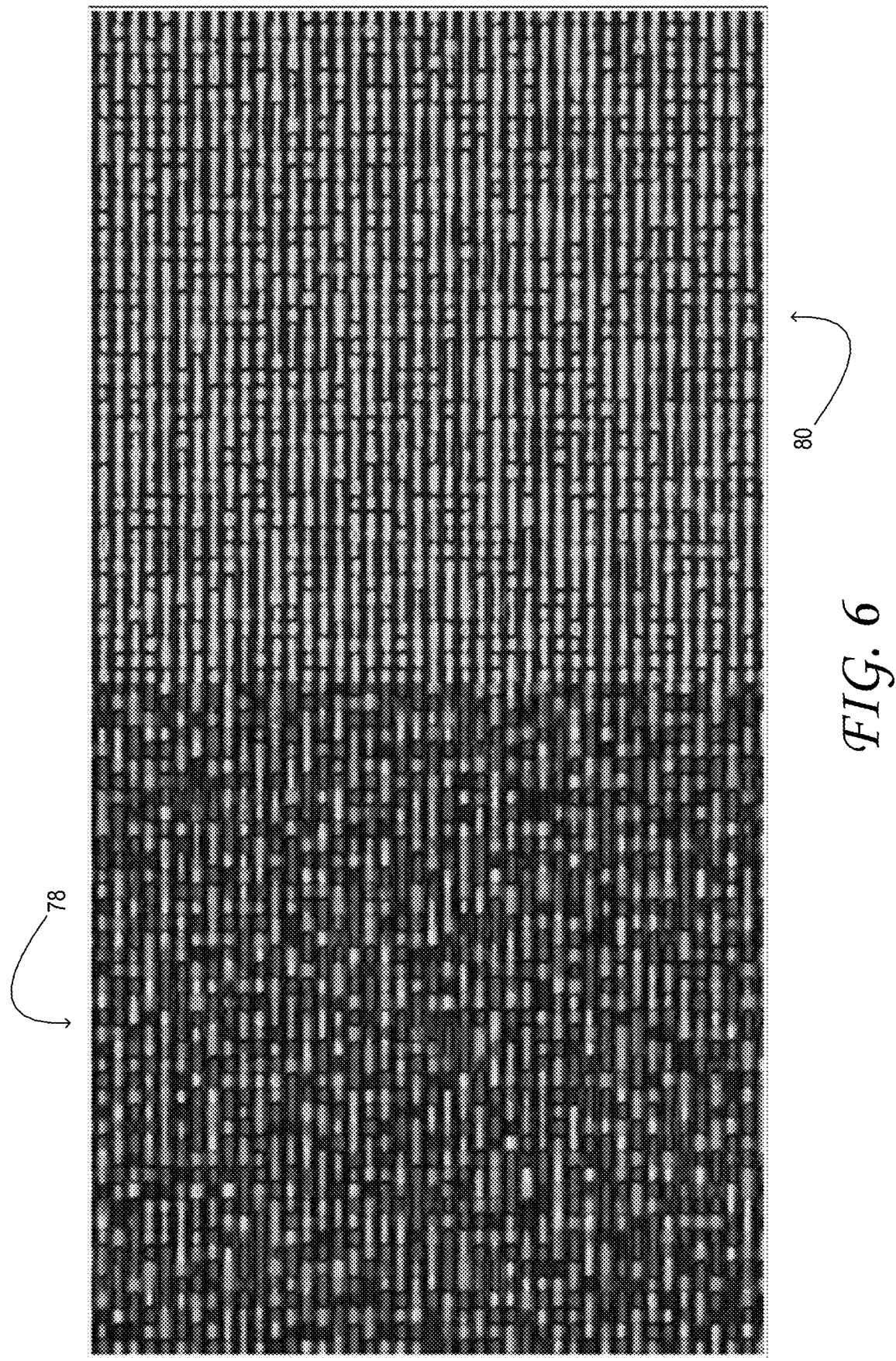
FIGS. 6 and 7 show complementary birefringence maps of a layer of a substrate as modified by an example execution of the method of FIG. 5.

FIG. 6 shows complementary birefringence maps of a layer of a substrate as modified by execution of example method 60, in one example. The left panel of FIG. 6 is a map 78 of the azimuth angle as a function of XY position on the substrate layer after several rows of voxels have been written. The right panel of FIG. 6 is a corresponding map 80 of the retardance magnitude. Both maps reveal a regular array of voxels with little or no space between the voxels, each voxel having a strong retardance magnitude.

Figure 7:
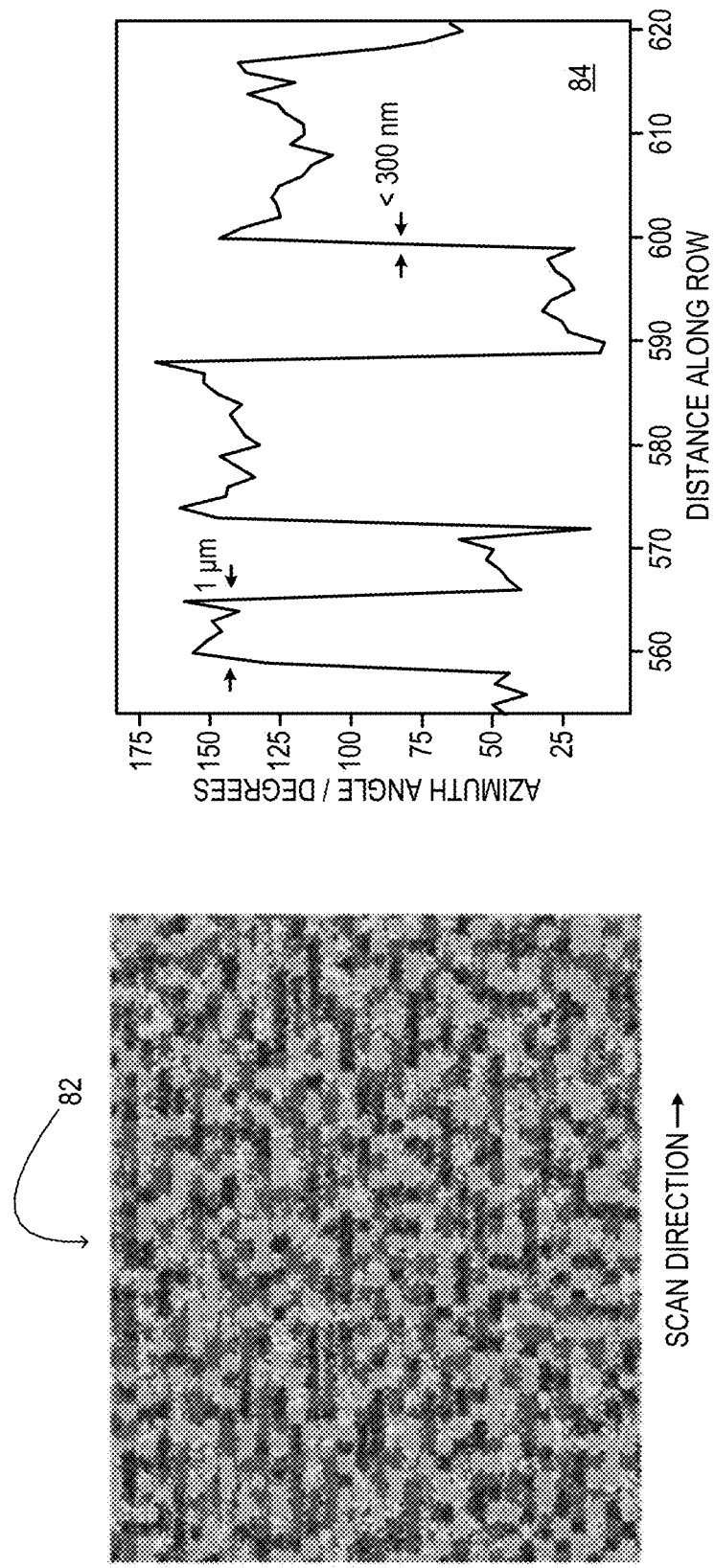

Continuing in the drawings, map 82 of FIG. 7 is an experimental azimuth-angle map plotted as a function of XY position on a single layer of substrate 12 after several rows of voxels have been written. These data, acquired by polarization imaging, show that a modified substrate formed according to the method of FIG. 5 includes at least one series of adjacent voxel volumes having contiguous first and second birefringent voxel volumes. In numerous instances in map 82, the birefringence of the first voxel volume encodes a first written symbol and the birefringence of the second voxel volume encodes a second written symbol unequal to the first. In particular, the birefringence of the first voxel volume may differ in azimuth angle from the birefringence of the second voxel volume. Plot 84 of FIG. 7 shows a 1D slice through a section of the indicated scan line of map 82. The plot shows very sharp transitions between symbols, indicating that the primed substrate material responds very rapidly to the changing polarization of the write beam.

Returning briefly to FIG. 5, graph 74 shows that it may be necessary to direct many pulses into a given locus in order to achieve a sufficiently high value of the retardance magnitude—i.e., a value at which the voxel birefringence is measurable by available read componentry (vide infra) with sufficient resolution to distinguish each symbol from other possible symbols. This condition may present difficulties for writing the first voxels of a row, including voxels at the boundary of a sector of data, which are not primed by the writing of earlier data. Even this issue, however, can be addressed by providing a series of early and late pulses via the moving locus. In particular, the polarization angle of the write beam may be modulated through a broad range of angles as the locus moves through a boundary region, so as to avoid committing any particular symbol to that region, but still priming the area within the locus. Then, once the locus fully exits the boundary region and is within the portion of the substrate where the first voxel is to be written, the polarization angle is modulated so as to achieve the desired azimuth angle for the first voxel.

In effect, the pulses of varying polarization angle delivered while the locus is still partially within the boundary region are 'early' pulses from the point of view of the first written voxel, while the pulses of specified polarization angle delivered once the locus has exited the boundary region are 'late' pulses from the point of view of that voxel. In this example, the polarization angle of the early pulses may be varied such that a retardance magnitude outside of the voxels to be written, but within the width of the locus remains below a symbol-encoding threshold. Other methods of pre-seeding, or priming, the initial voxels of a row or other series of voxels are also envisaged. For instance, such priming may be enacted by modulating the polarization state of a write beam to a state that does not correspond to any symbol of in current implementation. In some non-limiting examples, in implementations in which plane-polarized light is used to write each symbol, the polarization state of the write beam may be modulated to a circular or otherwise elliptical polarization.

Returning briefly to FIG. 2, write head 20A with modulation system 28A may be configured to record each substrate voxel serially. However, other write heads fully consonant with this disclosure support parallel or massively parallel data recording to increase throughput. To write data in parallel, the output of a high-power laser may be split into a plurality of independently modulated, child beams, so that a plurality of voxels may be written simultaneously. Each child beam, however, must be rotated to the particular polarization state appropriate for the symbol it writes.

Figure 8:
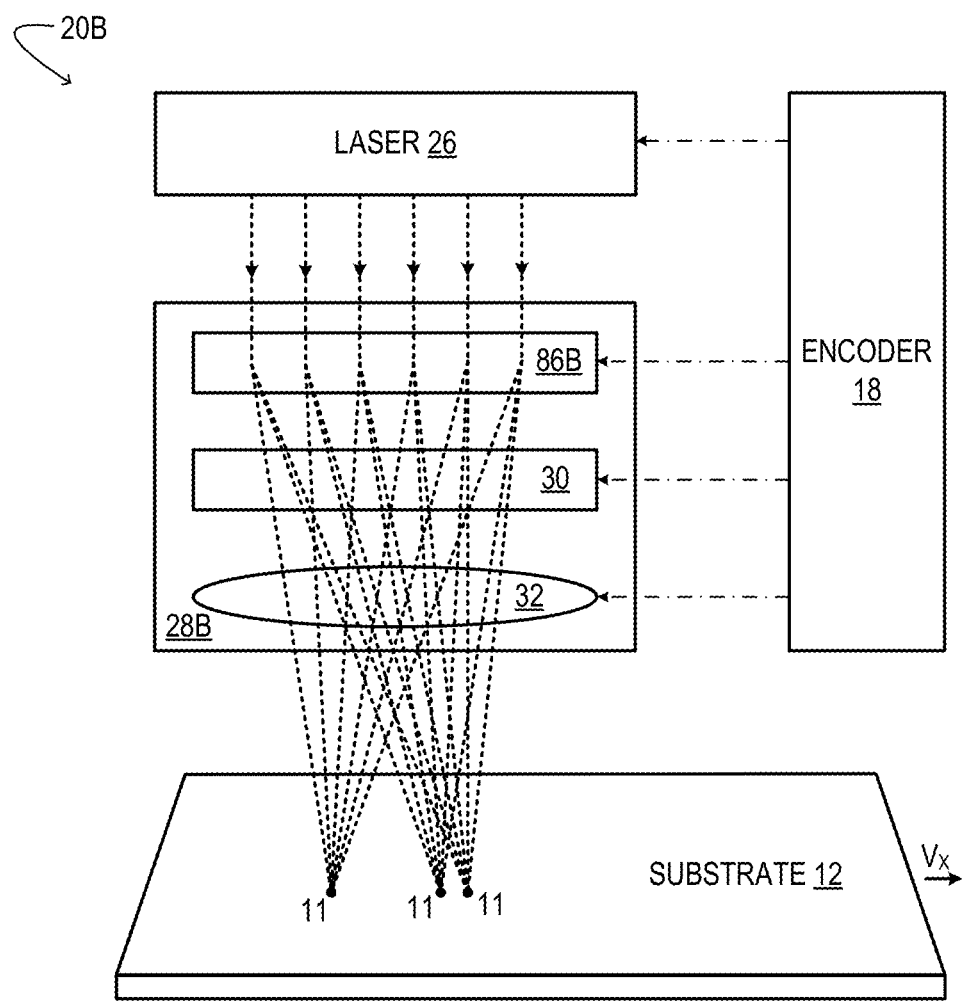
FIGS. 8 and 9 show aspects of other example write heads of example optical data-recording systems.

FIG. 8 shows aspects of an example write head 20B of optical data recording system 10B. Write head 20B includes a high-power laser 26 and a modulation system 28B. The modulation system includes an electronically addressable polarization modulator (PM) 30, and a focal system 32. To enable parallel writing, write head 20B also includes an electronically addressable liquid-crystal spatial light modulator (LCSLM) 86B.

LCSLM 86B is configured as a dynamic digital hologram. The LCSLM includes an array of pixel elements that receive the coherent wavefront of laser 26. The liquid crystal (LC) within each pixel element imparts a variable phase delay to the irradiance passing through that element. In a state-of-the-art LCSLM, the phase delay is in a unique direction common to all pixel elements of the array. Because each pixel element is independently addressable, the magnitude of the variable phase delay may be controlled down to the pixel level. As with any grating, a phase delay imparted in the near field of the LCSLM creates an interference pattern in the far field, where substrate 12 is positioned. By controlling the near-field phase delay from each pixel element of the LCSLM, the far-field interference pattern may be controlled so as to irradiate each voxel of any layer of the substrate with the desired intensity.

In write head 20B of FIG. 8, the holographic projection from LCSLM 86B passes through PM 30, a non-imaging active optic configured to rotate, by a controllably variable angle, the polarization state of the holographic projection. To the substrate, the holographic projection 'appears' as a parallel 2D array of write beams, each having controlled polarization and intensity, and each being mapped to a corresponding voxel of substrate 12. It will be noted that the mapping of LCSLM pixels to write beams (i.e., voxels) is not necessarily a 1:1 mapping, but may be 2:1, 4:1, or 10:1, among other suitable mappings. In some examples, the number of write beams achievable practically is about one-fourth the number of pixels on the LCSLM.

In write head 20B, LCSLM 86B and PM 30 are each coupled operatively to encoder 18. To the LCSLM, the encoder provides electronic signal that digitally defines the holographic projection; to the PM, the encoder provides electronic signal that defines the variable rotation applied to the polarization state of the holographic projection.

In some implementations, the array of pixel positions of LCSLM 86B may be grouped into a plurality of non-overlapping or marginally overlapping holographic zones, which are exposed sequentially to the wavefront of laser 26. Each holographic zone may be a two-dimensional area of any desired shape—e.g., rectangular, wedge-shaped, ring-shaped, etc. Accordingly, LCSLM 86B may be coupled mechanically to a scanning stage configured to change the relative positioning of the LCSLM versus the laser. In this manner, each of the holographic zones of the LCSLM may be irradiated in sequence. The scanning stage may be translational and/or rotational, and may be advanced a plurality of times (4, 9, 16 times, etc.) for each time that the LCSLM is addressed. This approach effectively multiplies the temporal bandwidth of the LCSLM beyond its maximum refresh rate. Nevertheless, the laser, LCSLM, PM, and substrate may be fixed in position in some examples. In examples in which data is to be written to a plurality of depth layers of substrate 12, adjustable objective focal system 32 is configured to focus the irradiance of the write beams from the LCSLM to any selected depth layer of the substrate.

In the configuration described above, LCSLM 86B is used primarily to divide the laser wavefront into the required number of child beams, while PM 30 sets the rotation of the far-field polarization based on the data to be written. In other examples, a single LCSLM is used to control both phase and polarization, down to the pixel level. This operation is within the ability of a suitably configured LCSLM, and is enacted by write head 20C of FIG. 9.

Figure 9:
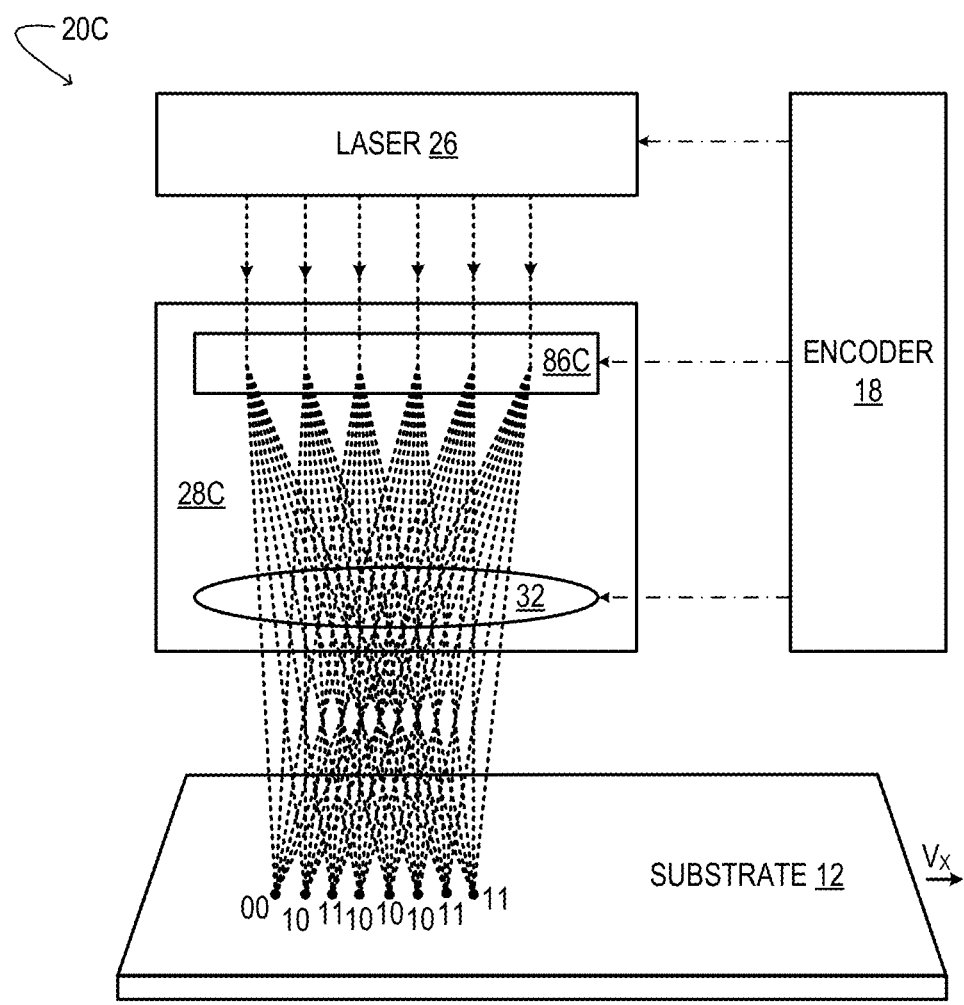

The array of pixel elements of LCSLM 86C of FIG. 9 is configured to modulate the phase and polarization of different portions of the wavefront by different amounts, and to diffract light from the different portions to a substrate with writeable optical properties. In particular, the LCSLM is configured to modulate the different portions of the wavefront to different near-field polarizations and to image the light to an array of substrate voxels at different far-field polarizations. To this end, the encoder logic is configured to receive data and to control modulation of the phase and polarization such that the light diffracted from the imaging optic writes the data to the substrate. Such data may include inequivalent first and second data values written simultaneously by the light diffracted from the imaging optic. Control of two different parameters may be effected independently or with correlation.

Conceptually, the more straightforward mode of controlling both phase and polarization is to control each parameter independently. This may be achieved via an LCSLM in which the various pixel elements are addressable to modulate phase, and independently addressable to modulate polarization. In other words, the LCSLM is configured to provide two independent degrees of freedom in the nematic director. Rotation in one direction affects phase and the other polarization. In effect, the pixel configuration of LCSLM 86C may enable each pixel to modulate the phase of the wavefront for X and Y polarization components independently. Thus, if the incoming wavefront is plane polarized, the modified LCSLM can variably rotate as well as variably retard each portion of the wavefront independently, controlled by voltages $V_{ij}$ and $U_{ij}$ applied to the independently addressable electrodes.

Correlated control of phase and polarization is the basis of another useful data-writing mode. Moreover, correlated control may be achieved using an LCSLM that provides only one depth-of-field per pixel. To this end, LCSLM 86C may be programmed to simultaneously project two different, but interrelated holograms: one representing phase retardance for horizontal polarization, the other representing phase retardance for vertical polarization.

Returning briefly to FIG. 1A, read head 90 of optical data recording system 10A is configured to read the data that has been stored on substrate 12A according to parameters supplied by read controller 92. The read data is then passed to decoder 94, which decodes and outputs the data to read buffer 96, from which output stream 98 is made available.

Figure 10:
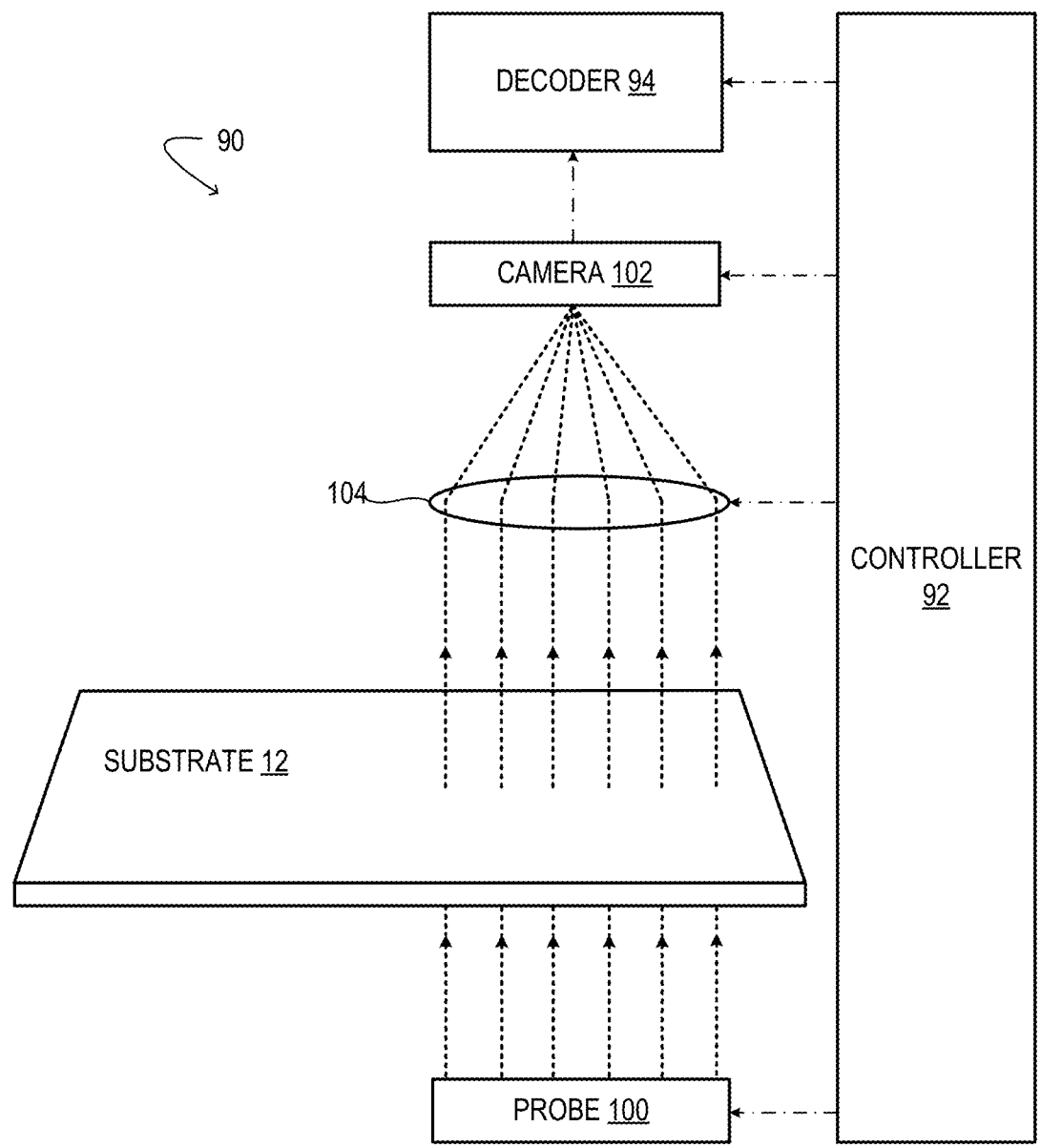
FIG. 10 shows aspects of an example read head of an example optical data-recording system with integrated data retrieval.

FIG. 10 shows aspects of an example read head 90. The read head includes a polarized optical probe 100 and an analyzer camera 102. The polarized optical probe may include a low-power diode laser or other polarized light source. Read controller 92 is coupled operatively to the polarized optical probe and configured to control the angle of the polarization plane of emission of the polarized optical probe.

Analyzer camera 102 may include a high-resolution/high frame-rate CMOS or other suitable photodetector array. The analyzer camera is configured to image light from polarized optical probe 100, after such light has interacted with the voxels of substrate 12A. In other examples, one or more discrete photodiodes or other detectors may be used in lieu of the analyzer camera. Although FIG. 10 shows transmission of polarized light rays through the medium and on to the camera, the light rays may, in alternative configurations, reach the camera by reflection from the medium.

Each image frame acquired by analyzer camera 102 may include a plurality of component images captured simultaneously or in rapid succession. The analyzer camera may resolve, in corresponding pixel arrays of the component images, localized intensity in different polarization planes. To this end, the analyzer camera may include switchable or tunable polarization control in the form of a liquid-crystal retarder or Pockels cell, for example. In one particular example, four images of each target portion of substrate 12 are acquired in sequence by the analyzer camera as the polarized optical probe 100 is rotated through four different polarization angles. This process is akin to measuring basis vectors of a multi-dimensional vector, where here the 'vector' captures the birefringent properties of the voxels of the imaged target portion. In some examples, a background image is also acquired, which captures the distribution of sample-independent polarization noise in the component images.

In examples in which data is to be read from a plurality of layers of substrate 12, read head 90 may include an adjustable collection focal system 104. The adjustable collection focal system may collect light rays diffracted from a selected depth layer of the optical storage medium, and reject other light rays. In other implementations, lensless imaging based on interferometry may be employed. In still other implementations, the distance between the read head and the substrate may be varied so as to select the depth layer of the substrate imaged by the analyzer camera or other detector.

In FIG. 10, data decoder 94 is configured to receive the component images from analyzer camera 102 and to enact the image processing necessary to retrieve the data stored in substrate 12. Such data may be decoded according to a machine-learned method and/or a canonical method in which an observable physical property is connected through one or more intermediates to the data read from the substrate.

The foregoing description and drawings should not be considered in a limiting sense, because numerous variations, extensions, and omissions are contemplated as well. For instance, while FIG. 5 illustrates a data-recording scenario in which the azimuth angle is varied but the pulsetrain amplitude is held constant over a series voxels, that aspect is not strictly necessary. In other examples, the pulsetrain amplitude may be modulated above a threshold amplitude—e.g., the minimum amplitude for achieving the voxel-priming effect disclosed herein. That approach may enable an encoding scheme in which waveplates presenting the same azimuth angle are differentiated by the relative strength of the waveplates, to lengthen the available bit sequence for each written symbol.

Although the description above indicates that the focal locus 34 of the coherent optical pulsetrain may move through substrate 12 at a constant relative velocity, in other examples, the mechanism controlling the motion of the write head, write beam, and/or substrate may be controlled so as to vary the relative velocity during the write process. For example, the locus may be paused over particular volumes of the substrate to facilitate the writing of data therein.

Although the description above indicates that in order to generate a fixed plurality of azimuth angles in symbol space, the coherent optical pulsetrain may be modulated to a corresponding fixed plurality of polarization states. In some examples, however, dynamic equalization and pre-distortion may be applied to the generated polarization states, such that a continuous range of polarization states is employed in practice. This approach may enable optimal transition of birefringence from one voxel to another in cases where voxels are written at a very high density.

Furthermore, while FIGS. 8 and 9 illustrate parallel data writing using LCSLM technology, numerous other parallel-writing approaches are also contemplated. These include spatial light modulation via digital micromirror arrays and other MEMS array structures, fixed phase plates, and beam-splitters, as examples.

In some embodiments, the methods and processes described herein may be tied to a computer system of one or more computing devices. In particular, such methods and processes may be implemented as a computer-application program or service, an application-programming interface (API), a library, and/or other computer-program product.

Figure 11:
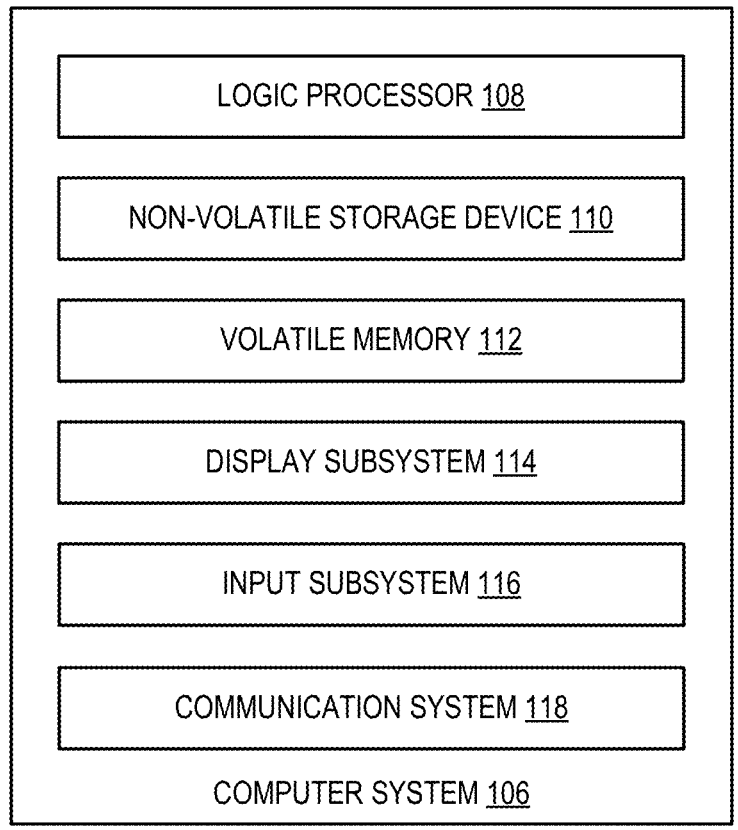
FIG. 11 shows aspects of an example computer system.

FIG. 11 schematically shows a non-limiting embodiment of a computer system 106 that can enact one or more of the methods and processes described above. Computer system 106 is shown in simplified form. Computer system 106 may take the form of one or more bench-top or server computers and/or dedicated electronic controllers. Encoder 18, controllers 22 and 92, and decoder 94 are examples of a computer system 106.

Computer system 106 includes a logic processor 108 volatile memory 112, and a non-volatile storage device 110. Computer system 106 may optionally include a display subsystem 114, input subsystem 116, communication subsystem 118, and/or other components not shown in FIG. 10.

Logic processor 108 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 108 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 110 includes one or more physical devices configured to hold instructions executable by the logic processors to implement the methods and processes described herein. When such methods and processes are implemented, the state of non-volatile storage device 110 may be transformed—e.g., to hold different data.

Non-volatile storage device 110 may include physical devices that are removable and/or built-in. Non-volatile storage device 110 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 110 may include nonvolatile, dynamic, static, read/write, read-only, sequential-access, location-addressable, file-addressable, and/or content-addressable devices. It will be appreciated that non-volatile storage device 110 is configured to hold instructions even when power is cut to the non-volatile storage device 110.

Volatile memory 112 may include physical devices that include random access memory. Volatile memory 112 is typically utilized by logic processor 108 to temporarily store information during processing of software instructions. It will be appreciated that volatile memory 112 typically does not continue to store instructions when power is cut to the volatile memory 112.

Aspects of logic processor 108, volatile memory 112, and non-volatile storage device 110 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 114 may be used to present a visual representation of data held by non-volatile storage device 110. The visual representation may take the form of a graphical user interface (GUI). As the herein described methods and processes change the data held by the non-volatile storage device, and thus transform the state of the non-volatile storage device, the state of display subsystem 114 may likewise be transformed to visually represent changes in the underlying data. Display subsystem 114 may include one or more display devices utilizing virtually any type of technology. Such display devices may be combined with logic processor 108, volatile memory 112, and/or non-volatile storage device 110 in a shared enclosure, or such display devices may be peripheral display devices.

When included, input subsystem 116 may comprise or interface with one or more user-input devices such as a keyboard, mouse, touch screen, etc. When included, communication subsystem 118 may be configured to communicatively couple various computing devices described herein with each other, and with other devices. Communication subsystem 118 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computer system 106 to send and/or receive messages to and/or from other devices via a network such as the Internet.

To conclude, one aspect of this disclosure is directed to a method to record data in a solid substrate. The method comprises modulating a polarization angle of a coherent optical pulsetrain; and while the polarization angle is being modulated, focusing the coherent optical pulsetrain on a locus moving through the solid substrate at a relative velocity, wherein the relative velocity, a width of the locus in a direction of the relative velocity, and a rate of modulation of the polarization angle are such that the substrate receives within the width of the locus two or more pulses of the optical pulsetrain differing in polarization angle, and wherein the two or more pulses record, in different portions of the substrate within the width of the locus, two or more different symbols.

In some implementations, the two or more pulses are received within a first volume of a row of congruent volumes of the solid substrate; here, the method further comprises maintaining an amplitude of the coherent optical pulsetrain and continuing to modulate the polarization angle as the locus moves from the first volume to a second volume of the row. In some implementations, receipt of the two or more pulses forms two or more voxels within the width of the locus, and each of the two or more voxels presents a different birefringence to probe light. In some implementations, the two or more pulses include one or more early pulses and one or more late pulses received later than any of the one or more early pulses, and receipt of the one or more late pulses sets the birefringence of at least one of the voxels. In some implementations, an azimuth angle of the birefringence set by receipt of the one or more late pulses is determined by the polarization angle of the one or more late pulses. In some implementations, receipt of the one or more early pulses increases a retardance magnitude of the birefringence of the at least one of the voxels at an azimuth angle set by receipt of the one or more late pulses. In some implementations, the polarization angle of the one or more early pulses is varied such that a retardance magnitude outside of the two or more voxels but within the width of the locus remains below a symbol-encoding threshold. In some implementations, modulating the polarization angle includes synchronously rotating a plane of oscillation of an electric field vector of the coherent optical pulsetrain through a series of pre-selected angles. In some implementations, the coherent optical pulsetrain includes a series of optical pulses each having a duration of 10 picoseconds or less.

Another aspect of this disclosure is directed to a solid substrate comprising: at least one series of adjacent voxel volumes probeable by polarization imaging, the at least one series including contiguous first and second birefringent voxel volumes, wherein a birefringence of the first voxel volume encodes a first written symbol and the birefringence of the second voxel volume encodes a second written symbol.

In some implementations, the first written symbol differs from the second written symbol. In some implementations, the birefringence of the first voxel volume differs in azimuth angle from the birefringence of the second voxel volume. In some implementations, the substrate comprises silica glass.

Another aspect of this disclosure is directed to a data-recording system comprising: a modulation system configured to modulate a polarization angle of a coherent optical pulsetrain focused on a locus; a solid substrate arranged to receive the coherent optical pulse train at the locus; an actuator configured to vary a relative position of the locus to the solid substrate at a relative velocity while the polarization angle is being modulated; and an encoder. The encoder is configured to control the relative velocity and a rate of modulation of the polarization angle such that the substrate receives within the width of the locus two or more pulses of the optical pulsetrain differing in polarization angle and encoding two or more different symbols.

In some implementations, the two or more pulses are received within a first volume of a series of consecutive, congruent volumes of the solid substrate, and the encoder is configured to maintain an amplitude of the coherent optical pulsetrain as the locus moves from the first volume to a second volume of the series. In some implementations, receipt of the two or more pulses forms two or more voxels within the width of the locus, and each of the two or more voxels presents a different birefringence to probe light. In some implementations, the two or more pulses include one or more early pulses and one or more late pulses received later than the one or more early pulses, receipt of the one or more late pulses sets an azimuth angle of the birefringence of at least one of the voxels, and the azimuth angle set by receipt of the one or more late pulses is determined by the polarization angle of the one or more late pulses. In some implementations, receipt of the one or more early pulses increases a retardance magnitude of the birefringence of the at least one of the voxels at the azimuth angle set by receipt of the one or more late pulses. In some implementations, the data-recording system further comprises a laser configured to emit the coherent optical pulsetrain, and the modulation system includes one or more of a polarization modulator and a spatial light modulator. In some implementations, the actuator is configured to move the solid substrate relative to the locus.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to record data in a solid substrate, the method comprising:
   modulating a polarization angle of a coherent optical pulsetrain; and
   while the polarization angle is being modulated, focusing the coherent optical pulsetrain on a locus moving through the solid substrate at a relative velocity,
   wherein the relative velocity, a width of the locus in a direction of the relative velocity, and a rate of modulation of the polarization angle are such that the substrate receives within the width of the locus two or more pulses of the optical pulsetrain differing in polarization angle, and
   wherein the two or more pulses record, in different portions of the substrate within the width of the locus, two or more different symbols.

2. The method of claim 1 wherein the two or more pulses are received within a first volume of a row of congruent volumes of the solid substrate, and wherein the method further comprises maintaining an amplitude of the coherent optical pulsetrain and continuing to modulate the polarization angle as the locus moves from the first volume to a second volume of the row.

3. The method of claim 1 wherein receipt of the two or more pulses forms two or more voxels within the width of the locus, and wherein each of the two or more voxels presents a different birefringence to probe light.

4. The method of claim 3 wherein the two or more pulses include one or more early pulses and one or more late pulses received later than any of the one or more early pulses, and wherein receipt of the one or more late pulses sets the birefringence of at least one of the voxels.

5. The method of claim 4 wherein an azimuth angle of the birefringence set by receipt of the one or more late pulses is determined by the polarization angle of the one or more late pulses.

6. The method of claim 4 wherein receipt of the one or more early pulses increases a retardance magnitude of the birefringence of the at least one of the voxels at an azimuth angle set by receipt of the one or more late pulses.

7. The method of claim 4 wherein the polarization angle of the one or more early pulses is varied such that a retardance magnitude outside of the two or more voxels but within the width of the locus remains below a symbol-encoding threshold.

8. The method of claim 1 wherein modulating the polarization angle includes synchronously rotating a plane of oscillation of an electric field vector of the coherent optical pulsetrain through a series of pre-selected angles.

9. The method of claim 1 wherein the coherent optical pulsetrain includes a series of optical pulses each having a duration of 10 picoseconds or less.

10. A data-recording system comprising:
    a modulation system configured to modulate a polarization angle of a coherent optical pulsetrain focused on a locus;
    a solid substrate arranged to receive the coherent optical pulse train at the locus;
    an actuator configured to vary a relative position of the locus to the solid substrate at a relative velocity while the polarization angle is being modulated; and
    an encoder configured to control the relative velocity and a rate of modulation of the polarization angle such that the substrate receives within the width of the locus two or more pulses of the optical pulsetrain differing in polarization angle and encoding two or more different symbols.

11. The data-recording system of claim 10 wherein the two or more pulses are received within a first volume of a series of consecutive, congruent volumes of the solid substrate, and wherein the encoder is configured to maintain an amplitude of the coherent optical pulsetrain as the locus moves from the first volume to a second volume of the series.

12. The data-recording system of claim 10 wherein receipt of the two or more pulses forms two or more voxels within the width of the locus, and wherein each of the two or more voxels presents a different birefringence to probe light.

13. The data-recording system of claim 12 wherein the two or more pulses include one or more early pulses and one or more late pulses received later than the one or more early pulses, wherein receipt of the one or more late pulses sets an azimuth angle of the birefringence of at least one of the voxels, and wherein the azimuth angle set by receipt of the one or more late pulses is determined by the polarization angle of the one or more late pulses.

14. The data-recording system of claim 13 wherein receipt of the one or more early pulses increases a retardance magnitude of the birefringence of the at least one of the voxels at the azimuth angle set by receipt of the one or more late pulses.

15. The data-recording system of claim 10 further comprising a laser configured to emit the coherent optical pulsetrain, wherein the modulation system includes one or more of a polarization modulator and a spatial light modulator.

16. The data-recording system of claim 10 wherein the actuator is configured to move the solid substrate relative to the locus.

* * * * *